US009916171B2

United States Patent
Bala et al.

(10) Patent No.: US 9,916,171 B2
(45) Date of Patent: Mar. 13, 2018

(54) APPLICATION DISCOVERY IN VIRTUAL MACHINES USING TEMPORAL CLUSTERING OF INSTALLATION FILES

(71) Applicant: International Business Machines Corporation, Armonk, NY (US)

(72) Inventors: Vasanth Bala, Rye, NY (US); Ea-Ee Jan, Ardsley, NY (US); Lakshminarayanan Renganarayana, San Jose, CA (US); Wolfgang O. H. Richter, Pittsburgh, PA (US); Xiaolan Zhang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 14/327,917

(22) Filed: Jul. 10, 2014

(65) Prior Publication Data

US 2016/0011892 A1    Jan. 14, 2016

(51) Int. Cl.
  *G06F 9/455*    (2006.01)
  *G06F 9/44*    (2018.01)
  *G06F 9/445*    (2018.01)

(52) U.S. Cl.
  CPC ............ *G06F 9/45533* (2013.01); *G06F 8/60* (2013.01); *G06F 8/61* (2013.01); *G06F 8/71* (2013.01)

(58) Field of Classification Search
  CPC ................................ G06F 9/45558; G06F 8/71
  See application file for complete search history.

(56) References Cited

U.S. PATENT DOCUMENTS

| 6,123,737 | A | 9/2000 | Sadowsky |
| 6,213,737 | B1 * | 4/2001 | Murakami ............ F04D 19/042 310/90.5 |
| 2004/0181790 | A1 | 9/2004 | Herrick |
| 2008/0133972 | A1 * | 6/2008 | Verbowski ............. G06F 21/57 714/37 |
| 2010/0077479 | A1 | 3/2010 | Viljoen |
| 2012/0036442 | A1 | 2/2012 | Dare et al. |

(Continued)

FOREIGN PATENT DOCUMENTS

EP    2214099 A1    4/2010

OTHER PUBLICATIONS

Dyer, "The management of software engineering Part IV: Software development practices", Copyright 1980 by International Business Machines Corporation, IBM Syst. J, vol. 19, No. 4, 1980, pp. 451-465.

(Continued)

*Primary Examiner* — Wei Zhen
*Assistant Examiner* — Brahim Bourzik
(74) *Attorney, Agent, or Firm* — Nicholas L. Cadmus; Isaac J. Gooshaw (57) ABSTRACT

In an approach for detecting one or more applications in a VM, one or more processors establish a time duration. One or more processors detect two or more files, each file in the two or more files having a time stamp time that differs from a last modified time stamp time of at least one other file in the two or more files by no more than the time duration. One or more processors record an identifier for each file of the two or more files, a location, a name, and a last modified time stamp time of each file of the two or more files. One or more processors map the two or more files to an application installed on the VM.

18 Claims, 3 Drawing Sheets

(56) References Cited

U.S. PATENT DOCUMENTS

| | | | |
|---|---|---|---|
| 2012/0054875 A1 | 3/2012 | Antill | |
| 2013/0111473 A1* | 5/2013 | Ammons | G06F 9/45558 |
| | | | 718/1 |
| 2013/0159627 A1* | 6/2013 | Shea | G06F 12/0897 |
| | | | 711/122 |
| 2013/0159987 A1* | 6/2013 | Shi | G06F 9/45558 |
| | | | 717/170 |
| 2014/0047436 A1* | 2/2014 | Jayachandran | G06F 8/71 |
| | | | 718/1 |

OTHER PUBLICATIONS

Freisleben et al., "Checking Running and Dormant Virtual Machines for the Necessity of Security Updates in Cloud Environments", Published in Cloud Computing Technology and Science (CloudCom), 2011 IEEE Third International Conference on Nov. 29-Dec. 1, 2011, pp. 239-246.

Tausworthe, "Algorithms for Software Development Version Control and Change Detection", DSN Data Systems Section, TDA Progress Report 42-69, Mar. and Apr. 1982.

Ammons et al., "Virtual machine Images as structures data: the Mirage image library", IBM Research, HotCloud'11 Proceedings of the 3rd USENIX conference on Hot topics in cloud computing, Portand, OR, Jun. 14-15, 2011, © 2011, pp. 1-6.

\* cited by examiner

APPLICATION DISCOVERY IN VIRTUAL MACHINES USING TEMPORAL CLUSTERING OF INSTALLATION FILES

BACKGROUND OF THE INVENTION

The present invention relates generally to application discovery in large computer systems and more specifically to automated detection of an application in a virtual machine image or in a virtual machine that is executing.

The administration of large computer systems to enhance their performance includes application discovery in virtual machines (VM) that may run on them. A VM is an application, sometimes called a hypervisor, that runs either directly on a host machine or under control of an operating system (OS) the runs on a host computer. A VM emulates the actions of the architecture, configuration, and devices of an emulated computer, a potentially different computer from the host. The VM emulates the execution of programs on it as the emulated computer would execute the programs. The programs the VM emulates are compiled to the instruction set of the emulated computer, not that of the host computer. An OS for the emulated computer may be installed on an appropriate VM and applications that are installed on that VM are run under the control of the OS, just as they would had they been installed directly on the emulated computer and run under the control of the same OS. A VM image is a file that contains a VM, the software installed on it, potentially an OS and applications installed on the OS, and the configuration of the physical computer that the VM emulates. Over time, collections of VM images may accrue, as each VM image may represent a physical machine configured for a specific purpose. A management of multiple VMs, in which the VMs may contain a variety of different applications and versions of different applications, requires timely information about the contents of the VMs.

SUMMARY

Aspects of an embodiment of the present invention disclose a method, program product, and system for detecting one or more applications in a VM. The method includes establishing, by one or more processors, a time duration. The method further includes detecting, by one or more processors, two or more files, each file in the two or more files having a time stamp time that differs from a last modified time stamp time of at least one other file in the two or more files by no more than the time duration. The method further includes recording, by one or more processors, an identifier for each file of the two or more files, a location, a name, and a last modified time stamp time of each file of the two or more files. The method further includes mapping, by one or more processors, the two or more files to an application installed on the VM.

DETAILED DESCRIPTION

The management, maintenance, and exploitation of collections of VM images are a current focus of research. Collections of VM images may be mined for valuable information or patterns. One important characteristic of a VM are the programs installed on the VM, as they affect the performance of the VM and the performance of the host computer that is executing the VM. A technique for an automated detection of these programs is highly beneficial and is an active area of research.

If an application is installed in a computer, one or more files associated with the application are written to a storage medium and information about each of the one or more files is stored with each file. Information that is usually stored with a file includes a time and date that the file was last modified, called a last modified time stamp. When the file is first written, as during an installation of an application that the file is associated with, the last modified time stamp is set to the time that the file is first written to a storage medium. Therefore if a plurality of files is written to a storage medium during an installation of an application, all the files will have a last modified time stamp that is clustered in time. The last modified time stamps of the files will likely be closer in time to each other than to a last modified time stamp of another file that may be on a system that is not associated with the installation of the application.

During an installation of the application, files that are associated with an operating system may be modified. A file that is associated with the operating system is used and owned by the operating system but is modified during the installation of the application because the file contains information about the application that is necessary for the operating system to know. Knowledge of an operating system file that is modified during an installation of an application and a knowledge of an application file that is written during the installation of the application are helpful in a discovering contents of a virtual machine image.

Figure 1:
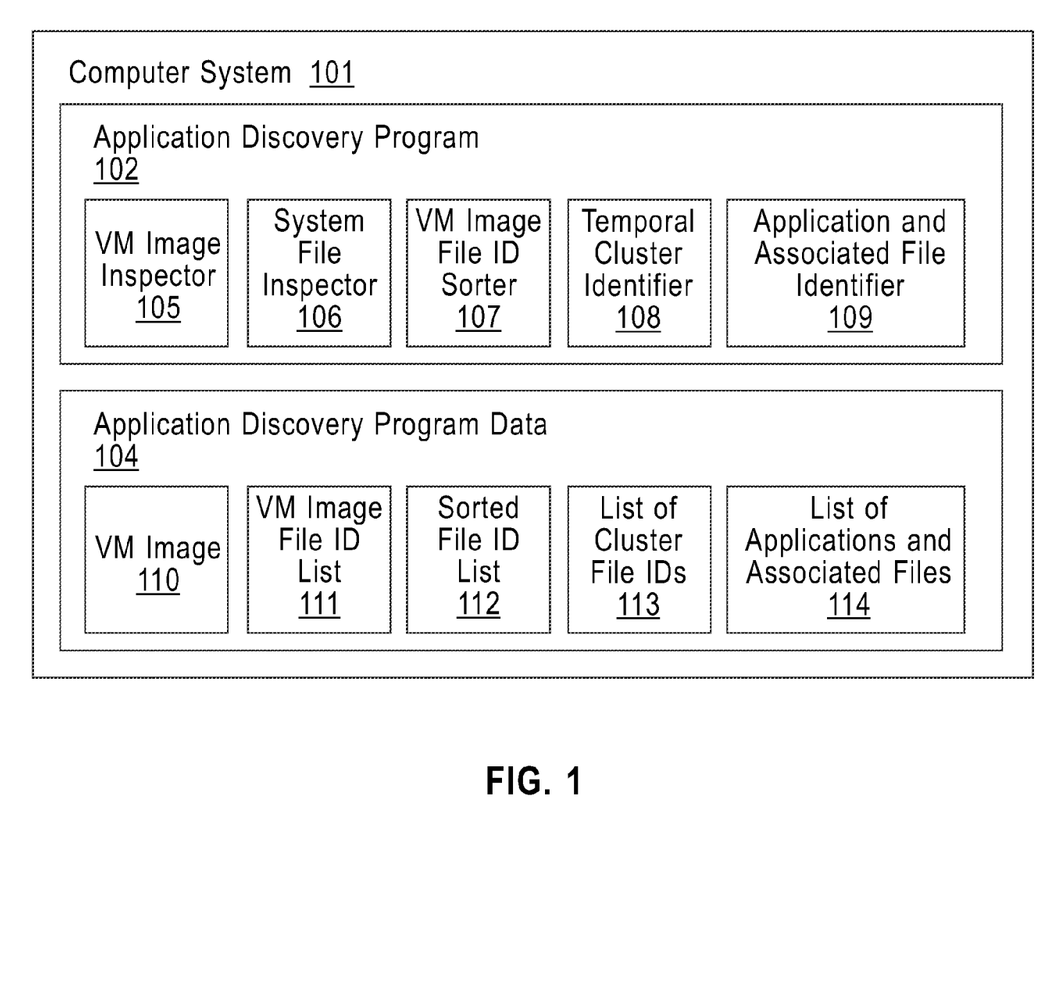
FIG. 1 is a block diagram of a computer system in accordance with an embodiment of the present invention.

The present invention will now be described in detail with reference to the Figures, in accordance with an embodiment of the present invention. FIG. 1 depicts computer system 101 on which application discovery program 102 executes. Application discovery program 102 writes to and reads from application discovery program data 104 during an execution of application discovery program 102. Application discovery program 102 includes VM image inspector 105, system file inspector 106, VM image file ID sorter 107, temporal cluster identifier 108, and application and associated file identifier 109. Application discovery program data 104 contains VM image 110, VM image file ID list 111, sorted file ID list 112, list of cluster file IDs 113, and list of applications and associated files 114. In one embodiment, information in application discovery program data 104 is stored on a persistent storage medium such as a hard disk or solid-state drive, but those skilled in the art know that application discovery program data 104 may be stored in memory or on another medium, that may be persistent or non-persistent. In one embodiment, application discovery program 102 is resident in memory during an execution of application discovery program 102, but those skilled in the art know that application discovery program 102 may be resident on another medium, persistent or non-persistent.

VM image inspector 105 accesses VM image 110 in application discovery program data 104 and exposes a content of VM image 110 in an organized format and inspects a file system structure of VM image 110. For each file in VM image 110, VM image inspector 105 creates an identification, called a file ID, which records at least a location of the file, a last modified time stamp of the file, and a name of the file. VM image inspector 105 creates VM image file ID list 111 which is a file that records a file ID of each file in VM image 110 and stores VM image file ID list 111 in application discovery program data 104.

System file inspector 106 inspects VM image 110 for one or more operating system files. System file inspector 106 opens each of the one or more operating system files that include a plurality of individual and writable sections, each section having a last modified time stamp. For each section with a last modified time stamp, system file inspector 106 creates a file ID that includes at least a location of the operating system file the section is in, a location of the section, a last modified time stamp of the section, a name of the operating system file the section is in, and a name of the section. System file inspector 106 records each file ID that system file inspector 106 creates in VM image file ID list 111 in application discovery program data 104.

VM image file ID sorter 107 sorts file IDs in file ID list 111 by an age of a file ID. An age of a file ID is determined by a subtraction of a time of a last modified time stamp of the file ID from a current time that is held constant during a sorting operation by VM image file ID sorter 107. VM image file ID sorter 107 sorts one or more file IDs in VM image file ID list 111 from an oldest file ID to a youngest file ID and creates sorted ID file list 112 that contains an ID of each ID in VM image file ID list 112 in sorted order from a first file ID, which is an oldest file ID, to a last file ID, which is a youngest file ID.

Temporal cluster identifier 108 receives a time duration that is established by computer system 101 and creates one or more cluster files that each contain one or more file IDs in sorted file ID list 112. In other embodiments a time duration can be dynamically determined automatically by inspection of a distribution of last modified time stamp times of files in a VM. A last modified time stamp of a file ID in a cluster file is within the time duration of a last modified time stamp of at least one other file ID in the cluster file. Temporal cluster identifier 108 creates a cluster file ID for each of the one or more cluster files that temporal cluster identifier 108 created from the one or more file IDs in sorted file ID list 112. A cluster file ID includes at least a file ID of each of the one or more file IDs in the cluster file associated with the cluster file ID. Temporal cluster identifier 108 records a cluster file ID in list of cluster file IDs 113.

Application and associated file identifier 109 examines one or more cluster file IDs in list of cluster file IDs 113 and for each cluster file ID identifies an application and one or more operating system file sections that the cluster file ID is associated with. Information in a cluster file ID is likely to identify an application that has been installed in a VM for which VM image 110 is an image. When an application is installed in a VM whose image is VM image 110, one or more files associated with the application are installed in close time proximity in the VM and often have a last modified time stamp in close time proximity of one another. A section of an operating system file that is modified in close time proximity with an installation of the one or more files associated with the application is likely to be associated with the application. Therefore, a cluster ID is likely to contain one or more file IDs of an application's files and operating system file sections associated with the application because a last modified time stamp of the one or more file IDs in the cluster file ID are in close time proximity to one another. In an embodiment, a cluster ID is mapped to a specific application by direct inspection by a user. In another embodiment, a cluster ID is mapped to a specific application automatically by a machine learning approach that is trained on historical data. A neural net, for example, is trained on test data that represents an expectation of the characteristics of the data that the neural net will operate on. The test data can be historical mappings or contrived mappings that are known to be correct. Other machine learning approaches also employ training data in their development. One skilled in the art knows that there are many approaches that can be used to map the contents of a cluster to an application.

Application and associated file identifier 109 records in list of applications and associated files 114 a list of one or more applications and one or more associated files for each of the one or more applications that application and associated file identifier 109 has identified in list of cluster file IDs 113.

Figure 2:
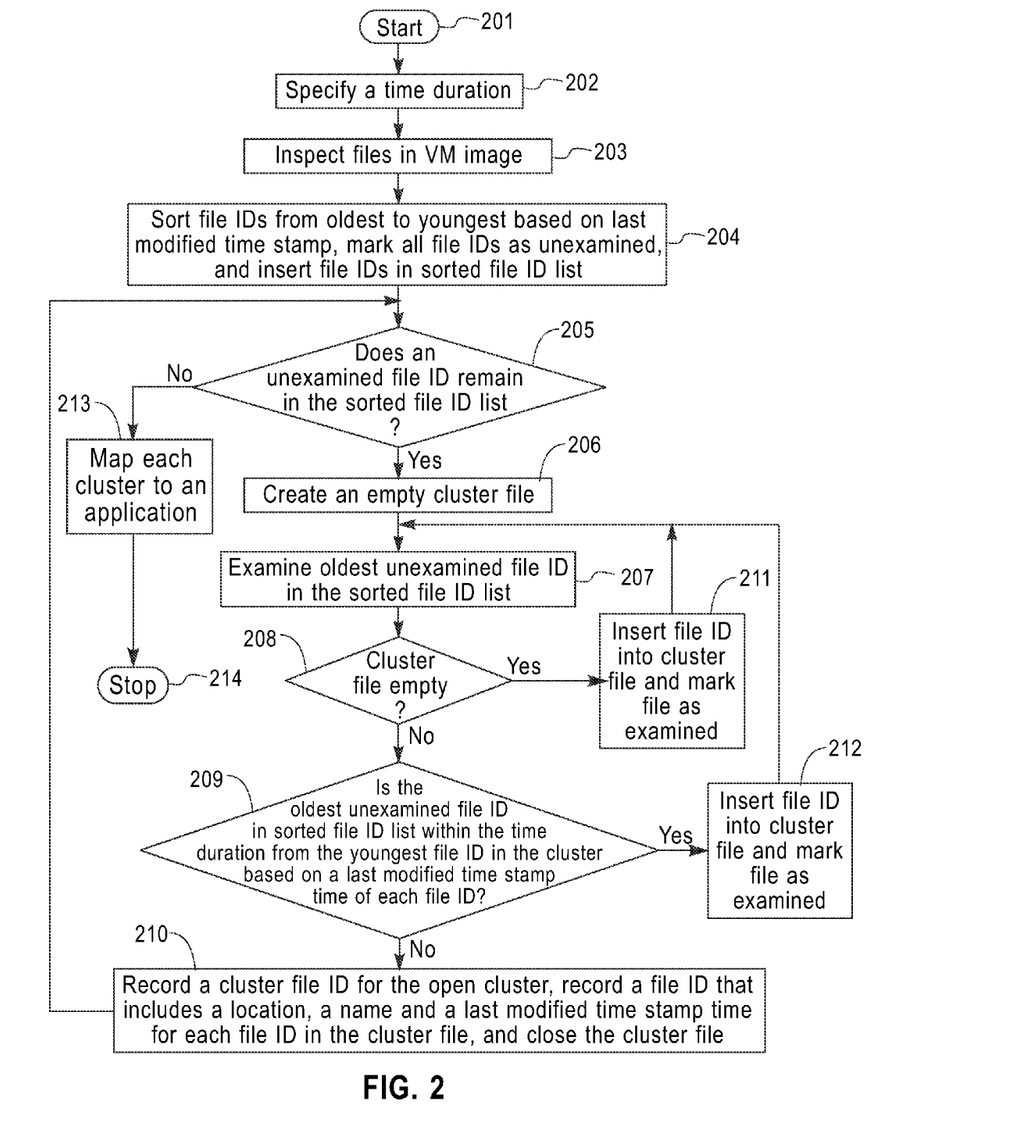
FIG. 2 is a flow chart of an application discovery operation executing within the computer system of FIG. 1 for discovering an application in a virtual machine image, in accordance with an embodiment of the present invention.

FIG. 2 is a flow chart of an application discovery operation executing within the computer system of FIG. 1 for discovering an application in a virtual machine image, in accordance with an embodiment of the present invention. The flowchart describes steps in a generation of one or more cluster file IDs, such that each generated cluster file ID is likely to describe an application and files associated with the application that are in VM image 110. The operation starts in step 201, and a time duration is specified by computer system 101 (step 202). In other embodiments a time duration can be dynamically determined automatically by inspection of a distribution of last modified time stamp times of files in a VM. For example, a time duration of 5 minutes can be specified by computer system 101.

VM image inspector 105 and system file inspector 106 inspect VM image 110 in application discovery program data 104 (step 203). In step 203 VM image inspector 105 and system file inspector 106 identify one or more files in VM image 110 and insert a file ID in VM image file ID list 111 for each file found in VM image 110. In step 204 VM image file ID sorter 107 sorts VM image file ID list 111, and creates sorted file ID list 112 (step 204). Sorted file ID list 112 contains one or more file IDs that are in VM image file ID list 111 in a sorted order from oldest to youngest based on a last modified time stamp of each of the one or more file IDs in VM image file list 111. An oldest file ID in sorted file ID list 112 is a first file ID in sorted file ID list and a youngest file ID in sorted file ID list 112 is a last file ID. VM image file ID sorter 107 marks each file ID in sorted file ID list 112 as unexamined (step 204).

In decision step 205, temporal cluster identifier 108 determines if at least one file ID in sorted file ID list 112 is unexamined. If no file ID in sorted file list 112 is unexamined, a process of a creation of one or more cluster file IDs is complete and each cluster file ID is mapped to an application on the VM image (step 213). The process then completes (step 214). In an embodiment, the mapping is performed off-line by a user. In another embodiment, the mapping is performed automatically using a machine learning approach that is trained on historical data. A neural net is an example machine learning technique that is trained on test data that can be historical data. In another embodiment, the mapping is accomplished by comparing the contents of a cluster with a predetermined signature of an application in which expected file activity during an installation of the application is specified. One skilled in the art knows that there are many approaches that can be used to map the contents of a cluster to an application.

If at least one file ID in sorted file ID list 112 is unexamined, temporal cluster identifier 108 creates an open cluster file (step 206). In step 207, temporal cluster identifier 108 inspects a first unexamined file ID in sorted file ID list 112. The first unexamined file ID in sorted file ID list 112 is an oldest unexamined file ID in sorted file ID list 112.

In decision step 208, temporal cluster identifier 108 determines if the open cluster file is empty and if the open file cluster is empty. In step 211 temporal cluster identifier 108 inserts a copy of a first unexamined file ID in sorted file ID list 112 into the open cluster file and marks the first unexamined file ID in sorted file ID list 112 as examined. A next step is step 207.

If, in step 208, temporal cluster identifier 108 determines that the open cluster file is not empty, in step 209 temporal cluster identifier 108 determines if a time of a modified time stamp of a first unexamined file ID in sorted file ID list 112 is within the specified time period of a time of a modified time stamp of a youngest file ID in the open cluster file. If the time of a modified time stamp of the first unexamined file ID in sorted file ID list 112 is within the specified time period of the time of a modified time stamp of a youngest file ID in the open cluster file, in step 211 temporal cluster identifier 108 inserts a copy of the first unexamined file ID in sorted file ID list 112 into the open cluster file and marks the first unexamined file ID in sorted file ID list 112 as examined. For example, if a time duration is 5 minutes, if the time of a modified time stamp of the first unexamined file ID in sorted file ID list 112 is within 5 minutes of the time of a modified time stamp of a youngest file ID in the open cluster file, in step 212 temporal cluster identifier 108 inserts a copy of the first unexamined file ID in sorted file ID list 112 into the open cluster file and marks the first unexamined file in sorted file ID list 112 as examined. A next step is step 207.

If in step 209 temporal cluster identifier 108 determines that a time of a modified time stamp of the first unexamined file ID in sorted file ID list 112 is not within the specified time period from a time of a modified time stamp of a youngest file ID in the open cluster file. For example, if a time duration is 5 minutes, if in step 209 temporal cluster identifier 108 determines that a time of a modified time stamp of the first unexamined file ID in sorted file ID list 112 is not within 5 minutes of a time of a modified time stamp of a youngest file ID in the open cluster file. A next step is step 210.

In step 210 temporal cluster identifier 108 identifies the open cluster file with a cluster file ID, records in the cluster file ID all a file IDs that are in the open cluster file, closes the open cluster file, and stores the cluster file ID in list of cluster file IDs 113. A next step is step 205.

If in step 209 temporal cluster identifier 108 determines that a time of a modified time stamp of the first unexamined file ID in sorted file ID list 112 is within the specified time period from a time of a modified time stamp of a youngest file ID, in step 212 temporal cluster identifier 108 adds a file ID of the first unexamined file ID in sorted file ID list 112 to the open cluster file and marks the first unexamined file ID in sorted file ID list 112 as examined. For example, if a time duration is 5 minutes, if in step 209 temporal cluster identifier 108 determines that a time of a modified time stamp of the first unexamined file ID in sorted file ID list 112 is within 5 minutes of a time of a modified time stamp of a youngest file ID, in step 212 temporal cluster identifier 108 adds a file ID of the first unexamined file ID in sorted file ID list 112 to the open cluster file and marks the first unexamined file ID in sorted file ID list 112 as examined. A next step is step 207.

Figure 3:
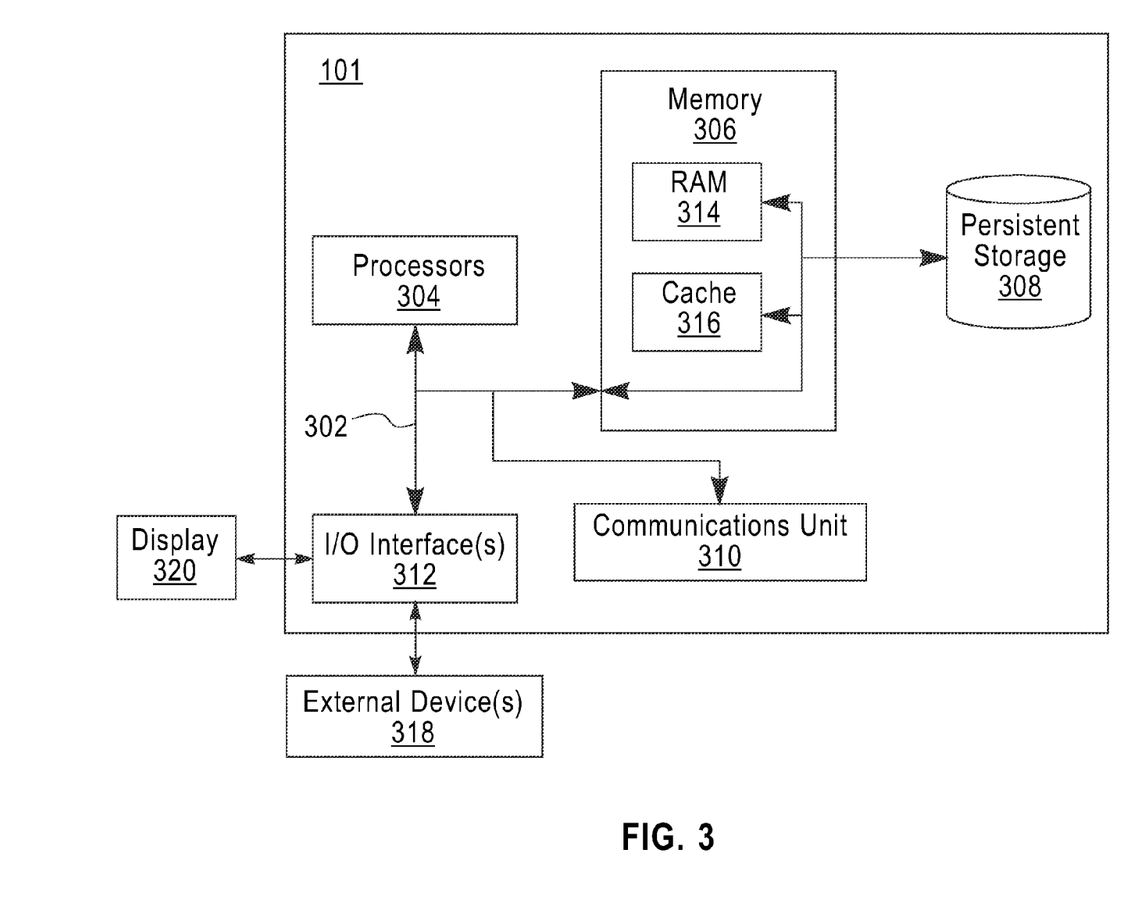
FIG. 3 depicts a block diagram of components of the computer system in FIG. 1, in accordance with an embodiment of the present invention.

FIG. 3 depicts a block diagram of components of computer system 101 in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computer system 101 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

Application discovery program 102 and application discovery program data 104 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Application discovery program 102 and application discovery program data 104 may be downloaded to persistent storage 308 through communications unit 310.

I/O interface(s) 312 allows for input and output of data with other devices that may be connected to computer system 101. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., application discovery program 102 and application discovery program data 104, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for detecting one or more applications in a virtual machine, the method comprising:
    establishing, by one or more processors, a time duration with (i) a starting point that is based, at least in part, on a time stamp of a youngest file of a set of files and (ii) an end point that is separated from the starting point by a predetermined period of time;
    detecting, by the one or more processors, two or more different files in the set of files, wherein (i) the two or more files are identified based, at least in part, on a content of an image of a virtual machine, wherein (ii) a first file in the two or more files has a last modified time stamp time that differs from a last modified time stamp time of a second file in the two or more files by no more than the time duration, and (iii) the first file is part of the first application and the second file is part of a second application, wherein installation of the first application altered a content of the second file;
    recording, by the one or more processors, an identifier for each file of the two or more files and a location, a name, and a last modified time stamp time of each file of the two or more files;
    mapping, by the one or more processors, the two or more files to the first application; and
    determining, by the one or more processors, an identity of the first application installed on the VM based, at least in part, on the mapping.

2. The method of claim 1, wherein one or more of (i) the mapping is executed using a machine learning approach that leverages historical data, wherein the historical data includes previous mappings of files to applications, (ii) the first application is installed on the virtual machine, and (iii) the second application is an operating system application.

3. The method of claim 1, further comprising:
    sorting, by one or more processors, files included in the set of files from oldest to youngest based on age, wherein an age of a given file in the set of files is determined by a subtraction of a time of a last modified time stamp associated with the given file from a current time that is held constant during the sorting.

4. The method of claim 1, further comprising the step of recording a group identifier for the two or more files, wherein the group identifier comprises an identifier, a location, a name, and a last modified timestamp of each of the two or more files.

5. The method of claim 1, further comprising:
    clustering, by one or more processors, the two or more different files into a cluster file based on respective ages of the two or more different files, wherein a given file included in the cluster file is within a time duration of a last modified time stamp of at least one other file in the cluster file.

6. The method of claim 3, wherein the step of establishing, by one or more processors, a time duration comprises dynamically determining the time duration automatically by inspection of a distribution of last modified time stamp times of the sorted files.

7. A computer program product for detecting one or more applications in a virtual machine, the computer program product comprising:
    one or more computer readable storage media and program instructions stored on the one or more computer readable storage media, the program instructions comprising:
    program instructions to establish a time duration with (i) a starting point that is based, at least in part, on a time stamp of a youngest file of a set of files and (ii) an end point that is separated from the starting point by a predetermined period of time;
    program instructions to detect two or more different files in the set of files, wherein (i) the two or more files are identified based, at least in part, on a content of an image of a virtual machine, wherein (ii) a first file in the two or more files has a last modified time stamp time that differs from a last modified time stamp time of a second file in the two or more files by no more than the time duration, and (iii) the first file is part of the first application and the second file is part of a second application, wherein installation of the first application altered a content of the second file;
    program instructions to record an identifier for each file of the two or more files and a location, a name, and a last modified time stamp time of each file of the two or more files;
    program instructions to map the two or more files to the first application; and
    program instructions to determine an identity of the first application installed on the VM based, at least in part, on the mapping.

8. The computer program product of claim 7, wherein one or more of (i) the mapping of the two or more files to the first application is executed using a machine learning approach that leverages historical data, wherein the historical data includes previous mappings of files to applications, (ii) the first application is installed on the virtual machine, and (iii) the second application is an operating system application.

9. The computer program product of claim 7, further comprising:
    program instructions to sort files included in the set of files from oldest to youngest based on age, wherein an age of a given file in the set of files is determined by a subtraction of a time of a last modified time stamp associated with the given file from a current time that is held constant during the sorting.

10. The computer program product of claim 7, further comprising:
    program instructions to record a group identifier for the two or more files, wherein the group identifier comprises an identifier, a location, a name, and a last modified timestamp of each of the two or more files.

11. The computer program product of claim 7, further comprising:
    program instructions to cluster the two or more different files into a cluster file based on respective ages of the two or more different files, wherein a given file included in the cluster file is within a time duration of a last modified time stamp of at least one other file in the cluster file.

12. The computer program product of claim 9, wherein the program instructions to establish a time duration comprise:
    program instructions to dynamically determine the time duration automatically by inspection of a distribution of last modified time stamp times of the sorted files.

13. A computer system for detecting one or more applications in a virtual machine, the computer system comprising:
    one or more computer processors, one or more computer readable storage media, and program instructions stored on the computer readable storage media for execution by at least one of the one or more processors, the program instructions comprising:
        program instructions to establish a time duration with (i) a starting point that is based, at least in part, on a time stamp of a youngest file of a set of files and (ii) an end point that is separated from the starting point by a predetermined period of time;
        program instructions to detect two or more different files in the set of files, wherein (i) the two or more files are identified based, at least in part, on a content of an image of a virtual machine, wherein (ii) a first file in the two or more files has a last modified time stamp time that differs from a last modified time stamp time of a second file in the two or more files by no more than the time duration, and (iii) the first file is part of the first application and the second file is part of a second application, wherein installation of the first application altered a content of the second file;
        program instructions to record an identifier for each file of the two or more files and a location, a name, and a last modified time stamp time of each file of the two or more files;
        program instructions to map the two or more files to the first application; and
        program instructions to determine an identity of the first application installed on the VM based, at least in part, on the mapping.

14. The computer system of claim 13, wherein one or more of (i) the mapping of the two or more files to the first application is executed using a machine learning approach that leverages historical data, wherein the historical data includes previous mappings of files to applications, (ii) the first application is installed on the virtual machine, and (iii) the second application is an operating system application.

15. The computer system of claim 13, further comprising:
    program instructions to sort files included in the set of files from oldest to youngest based on age, wherein an age of a given file in the set of files is determined by a subtraction of a time of a last modified time stamp associated with the given file from a current time that is held constant during the sorting.

16. The computer system of claim 13, further comprising:
    program instructions to record a group identifier for the two or more files, wherein the group identifier comprises an identifier, a location, a name, and a last modified timestamp of each of the two or more files.

17. The computer system of claim 13, further comprising:
    program instructions to cluster the two or more different files into a cluster file based on respective ages of the two or more different files, wherein a given file included in the cluster file is within a time duration of a last modified time stamp of at least one other file in the cluster file.

18. The computer system of claim 15, wherein the program instructions to establish a time duration comprise:
    program instructions to dynamically determine the time duration automatically by inspection of a distribution of last modified time stamp times of the sorted files.

* * * * *